May 6, 1969  A. C. PETERSON  3,442,082
TURBINE GAS GENERATOR AND WORK PROPULSION SYSTEM
FOR AIRCRAFT AND OTHER VEHICLES
Filed Dec. 19, 1966  Sheet 1 of 2

INVENTOR.
ADOLPHE C. PETERSON

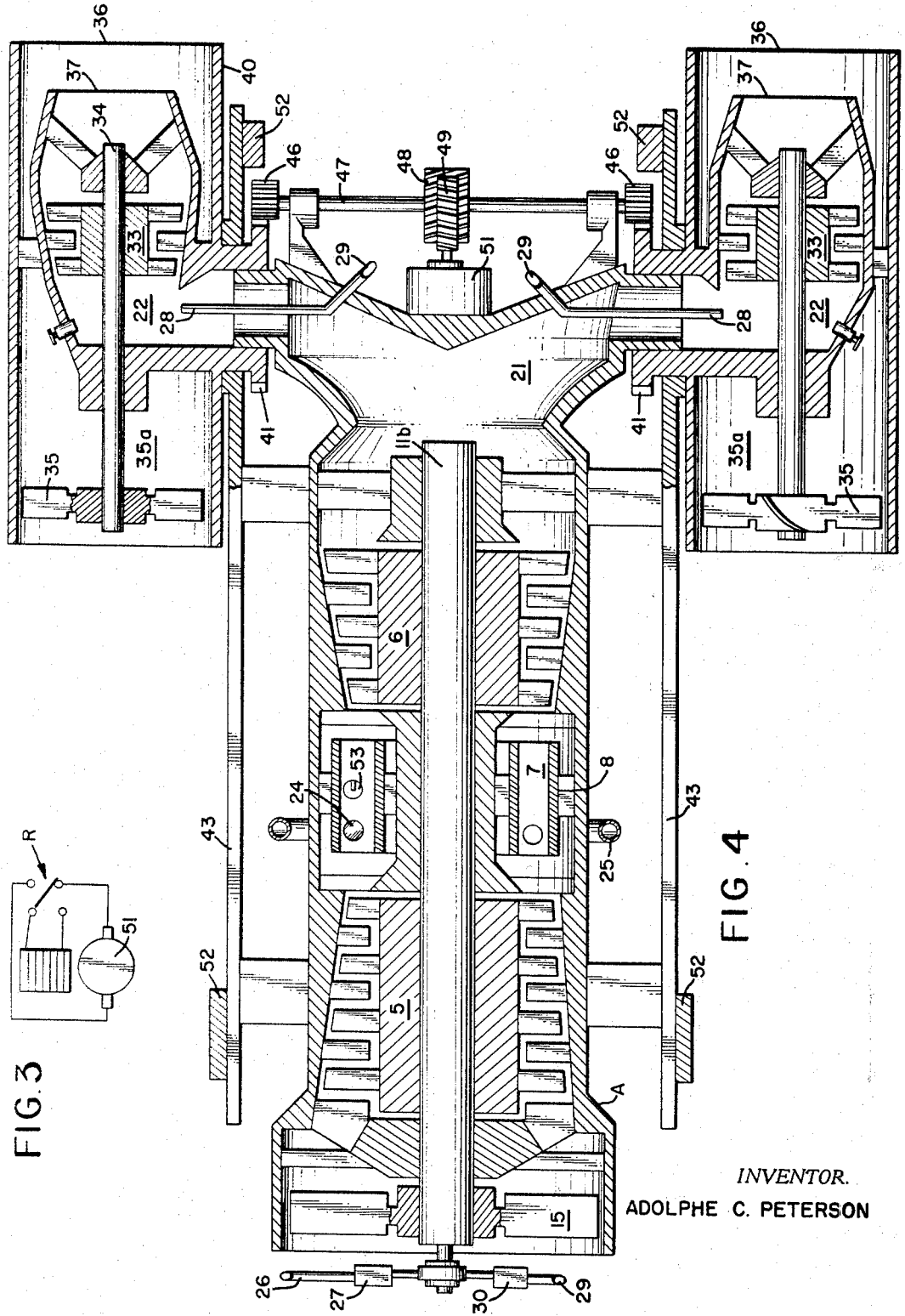

United States Patent Office 3,442,082
Patented May 6, 1969

3,442,082
TURBINE GAS GENERATOR AND WORK PROPULSION SYSTEM FOR AIRCRAFT AND OTHER VEHICLES
Adolphe C. Peterson, 4623 Bruce Ave. S., Minneapolis, Minn. 55424
Filed Dec. 19, 1966, Ser. No. 602,625
Int. Cl. F02k *1/02, 3/04;* F02c *7/02*
U.S. Cl. 60—224        5 Claims

ABSTRACT OF THE DISCLOSURE

This invention disclosed relates especially to the class of engine and propulsion means involving turbine gas generation means and utilization of pressurized gases in propulsion of supplementary work means which includes especially supplemental air stream propulsion and involved in gas generation means and also devices for change of direction of jet propulsion for aircraft jet propulsion.

---

My invention relates to systems of propulsion which have ability for propulsion in different ways, and especially to a system of propulsion which is especially adapted to the higher speed types of aircraft and because of its adaptability to various uses on an aircraft and also to various uses with different types of vehicles it is called Turbine Gas Generator and Work Propulsion System for Aircraft and Other Vehicles.

The chief objects of my invention are to provide an improvement in the ability of gas turbine engines for economical use and economical construction in proportion to the ability of the system to provide propulsion power or power for any use. There has especially been a necessity to provide high power for use either as high translational power in travel or for use in power for sustentation of the aircraft in slow speed flight such as is necessary in landing an aircraft. A chief object of this invention is to provide a form of power production and application whereby the power produced can readily and without too expensive construction and without too great effect upon ability for translational propulsion, be adaptable in use not only for translational propulsion but also for propulsion that can produce sustentational effect so as to thereby decrease the burden of sustentation that is ordinarily in aircraft to be borne by the wings of an aircraft for sustentation, thus providing sustentational ability for slow landing or take-off of aircraft and slow cruising such as when landing or hovering.

A particular object of this invention is to provide a form of engine which can provide, by its system, pressurized gaseous fluid or fluids for use in supplemental turbine or other rotary torque producing means, for use in any locomotional or stationary power use, such pressurized gaseous fluid or fluids being provided economically and efficiently by the system.

In general the object is to provide means for economical power for propulsion or sustentation or for other uses.

The principal devices and combinations of devices are as hereinafter described and as defined in the accompanying claims. In the accompanying drawings which illustrate my invention in several different forms, like characters refer to like parts insofar as practicable in each of the figures.

Referring to the drawings:

FIGURE 3 is a diagrammatic illustration of electric control means.

FIGURE 4 is a view in horizontal cross section and on a plane similar to that of the line 1—1 of FIGURE 2 but showing a modified form of the device, that is a second modified form, some parts being shown diagrammatically only, some parts broken away, some in plan view.

Figures 1, 2:
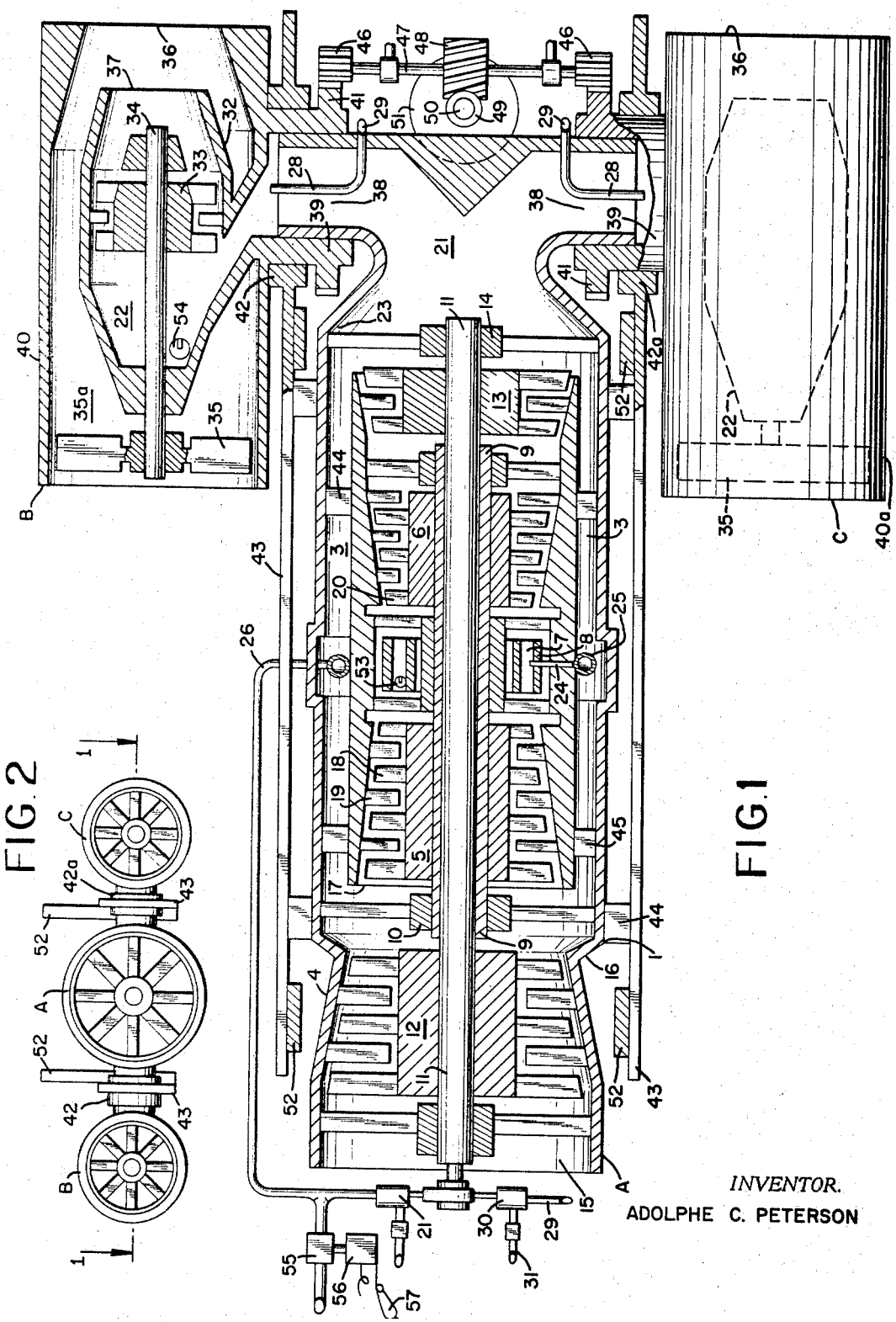
FIGURE 1 is a view chiefly in horizontal cross section on the line 1—1 of FIGURE 2, this line and plane of the devices being on a plane passing horizontally through the axes of all of the principal operating shafts and elements or units of the device.
FIGURE 2 is a view on a considerably smaller scale than the scale of FIGURE 1 and showing a general frontal view of the device, that is a frontal view of the propulsion device, as it would generally appear when mounted on or suspended from an aircraft, the locating of its mounting being at any location of the aircraft as would be most suitable for its mounting and for propulsion of an aircraft.

In all of the figures some parts are shown in full plan view.

Reference is first made to FIGURES 1 and 2 which show one form of my device. There are three chief operating divisions or parts of the device, one of which is a gas pressure creating unit A and two other divisions designated B and C, respectively. The divisions B and C, one of which is in horizontal cross section chiefly, and the other in full plan view, are, each of them, fan air casing conduits, by which their is fan air propulsion through air passes and discharge nozzles.

The gas pressure creating unit A is formed chiefly within an exterior casing structure 1 which is approximately cylindrical in shape throughout most of its length, and there is also formed interiorly of the casing structure 1 a second casing structure 2, and there is an annular pass for compressed air designated 3 and being between the casing structure 1 and the casing structure 2. The casing structure 1 at its extreme forward end forms a supplemental casing structure 4. There is formed in the casing structure 2 a primary or first compressor rotor means 5 and a turbine rotor means 6, which two means may otherwise be called compressor rotor and turbine rotor. Between these two rotors there is an annular combustion chamber 7 formed between two annular or cylindrical walls as shown and there are spaces of annular form both outside of and within the combustion chamber walls, the latter denoted as 8. The rotors 5 and 6 mounted on and fixed on, as by welding or other means, rotate with their affixed tubular shaft 9 which is mounted for rotation in static bearing means 10. Within the tubular shaft 9 there is placed a second shaft 11 which may be a solid shaft and is so shown and this shaft 11 rotates independently of the tubular shaft 9 and this shaft 11 at its forward (leftward) end has affixed thereto for rotation the secondary (or supplemental) compression rotor means or compression rotor 12, which is rotatable within the casing structure 4; and shaft 11 has, at its extreme rearward end, affixed thereto for rotation, the secondary or supplemental turbine rotor 13. The supplemental rotors, compression and turbine, rotate, by means of shaft 11, as an integral but independent rotor means, and are supported by the static bearings 14, so that shaft 11 and its rotors may have this independently and freely of the tubular shaft 9 and the rotors attached thereto.

The supplemental casing structure 4 at its extreme forward end has the air intake 15 and at its end by annular channel 16 passes compressed air to the annular air pass 3. Some of the air compressed by the secondary or supplemental compressor rotor flows by the open end 17 of the casing structure 2 to the rotor blades 18 and stator blades 19 within casing structure 2 and to the combustion chamber 7 and the air passes outside of walls of chamber 7 and after combustion with fuel passes to the gas pass about the turbine rotor and to impel the blades of that turbine rotor, blades designated 20, and the gases of combustion and air from within casing structure 2 pass by way of intermediate chamber 21 to the pair of tubularly formed gaseous fluid conduits, otherwise called pivotal conduits to the inlet chambers 22, one in division B and one in division C, one shown in full cross section, that in the other division being shown in dotted lines only. The gases from the rotor in casing structure 2 pass to intermediate chamber 21 and in so passing are joined with and mixed with the compressed air from the annular pass 3, that between srtucture 1 and structure 2, this entry of compressed air being at the entries designated 23. Pivotal conduits are designated 38.

The combination chamber 7 receives fuel for combustion by nozzles 24 from annular manifold 25 and thereby from fuel conduit 26 and fuel pump 27, the proportion of fuel being somewhat as usual in gas turbines for use with the air compressed by the first compressor rotor. There may be addition of fuel for further combustion by means of the two fuel nozzles 28, each of which delivers fuel, according to control, from fuel conduit 29 and fuel pump 30, the control being according to control by hand or any automatic control means 31.

Each of the divisions B and C has delivery of gases or gases and fuel, uncombusted air being carried with the other gases of combustion. The gases pass from intermediate chamber 21 to inlet chamber 22 formed in the turbine casing structure 32 wherein the second or work turbine 33 rotates and by shaft 34 rotates the air fan 35. The air fan 35 inducts air from ambient air forwardly and this air is discharged rearwardly through the nozzle discharge at 36 as propulsion air. The second turbine 33 discharges gases by its discharge 37 to be mixed with the propulsion air discharge and somewhat assist in propulsion. The description of the division B as immediately above applies also to the division C where the other air fan 35 is rotated by its turbine 33, this operating in the same manner.

The pivotal conduits are designated 38 and they do not rotate, and they are each within the pivot tube 39, one in division B and one in division C, and each is affixed with its associated tubular casing structure 40 and 40a and are affixed also, each with a rather large spur gear 41, one spur gear 41 at the inner end of the pivot tube 39 associated, so that the pivot tubes and spur gears rotate with and may be used to rotate the associated casing structure 40 or 40a on its axis which is axially of the pivotal conduits 38. The pivot tubes 39 are mounted in and are rotatable axially within the support bearings 42, 42a, and the latter are mounted on and securely affixed with the mounting beams 43, one of which is at one side of the casing structure 1 and the other is at the opposite side of the casing structure 1, there being mounting fixtures (brackets) 44 affixing the beams to the casing structure, and there are other mounting fixtures 45 which securely amount the casing structure 2 in proper location within the casing structure 1. The pair of spur gears 41 are each in permanent engagement with the smaller spur gears each of which is designated 46 and the gears 46 are fixed on shaft 47 which has worm wheel 48 fixed thereon to be in engagement with the smaller worm wheel 49 which is on the shaft 50 of the electric motor 51, the latter being controllable by any electric current supply and control means as such motors are commonly controlled. Such control should reverse the control drive to either direction of rotation. The control being shown in FIGURE 5.

Each of the mounting beams 43, firmly secured to it, has two vertical suspending or mounting posts 52 by which the propulsion device is secured to the aircraft or other vehicle which it is to propel. Any other mounting means may be used such as may be suitable for its intended use as a stationary power means or as a propulsion unit. The air fans 35 are shown as having two air propulsion blades, and the hub in cross section, but it is intended that the number of blades may be as many as is necessary to constitute an adequate air induction and propulsion means, and this number may be as many as twenty or thirty or even more blades or fan elements. Spark plugs 53 provide ignition in the combustion chamber 7 and spark plugs 54 provide ignition in the inlet chambers 22 although it is contemplated that there may be enough heat in the gases of combustion coming from the gas pressurizing unit A to provide ignition when there is new fuel entering from the nozzles 28.

It is customary in some turbine constructions to provide speed governing means, and such means are well known, and such means are therefore not shown in the drawings, although it is contemplated that any such governing means as may be necessary to prevent excessive speeds may be provided to govern the fuel admission. The compression rotors 5 and 12 should each have that number of stages of compression blades which will produce the degree of compression necessary, and the first turbine rotor and its associated compression rotor 5 should have that speed which will produce a higher degree of compression and preferably as high as may be produced by compression rotor means. For example the compression rotor 12 should produce a pressure of air, delivered partly to annular by-pass 3 and partly to compression rotor 5, which may be say fifty to seventy-five pounds per square inch, or even more if that may be attained, and the compression rotor 5 should produce a pressure of air delivered to combustion chamber 7 which must be greater than that pressure in air pass 3, and the pressure produced by compression rotor 5 should therefore be say one hundred pounds or about that pressure or even a higher pressure. The compression rotor 12 and its air intake and blade course should be so large as necessary, proportionately, to induct and compress a volume of air adequate to supply both the compression rotor 5 and the annular pass 3, so that there may be sufficient power produced by the first turbine rotor and the second turbine rotor to drive the compression rotors, the compression rotor 5 preferably being driven at a considerably higher speed than the compression rotor 12, and so that there may be combustion gases and some air delivered from rotor 13 to intermediate chamber 21 at a pressure which may be as much as fifty pounds or even more, and so that the air delivered from annular pass 3 to intermediate chamber 21 may also be at a pressure approximately the same as the exhaust pressure from turbine rotor 13, say about fifty pounds or even more, but preferably slightly less than the pressure of the gases from the rotor 13. Any means for starting of the compression rotors or either one of them may be provided as is customary in gas turbine usage.

The general operation, especially in its use for aircraft propulsion, is now described. It will be assumed that the device is mounted by the mounting posts 52 or in any other manner to be carried by an aircraft and furnish the propulsion power therefor. The means provided for starting, electric or otherwise as the construction may be, will now be used for starting either one of the shafts 9 or 11, as may be preferred, and fuel is caused to be delivered to the combustion chamber 7 by either the fuel pump means 27 or the fuel may be delivered especially at starting by an auxiliary fuel pump 55 operated by an electric motor 56 and under control of hand switch 57. Various means of delivering fuel are in use and any such means may be used and it may be electrically driven or driven by either of the shafts 9 or 11.

As air passes into the combustion chamber 7 and is ignited the flow of combustion gases and air increases until a normal flow is attained and in such normal flow for production of power, the atmospheric air from forwardly inducted into the turbine course of turbine rotor 6, by the compression rotors 12 and 5 and combustion in combustion chamber 7, and the shafts 9 and 11 are thus started in normal operation. In such flow the second (supplemental) compression rotor will compress all the inducted air to pressure of say fifty to seventy pounds pressure and the inducted air at that compression called the primary compression, divides into two streams, one stream flows into the compression course of compressor rotor 5 and the other stream flows into the annular pass 3. In the intermediate chamber 21, the exhaust gases and surplus air to some extent from turbine rotors 6–33 and the air stream from annular pass 3 unite and mix at a resultant pressure which may be say seventy pounds and the united gases and air stream will again divide and pass in two streams one stream by each of the pivotal conduits 38, one stream passing into inlet chamber 22 of one turbine rotor 33 of the one division B and the other passing into the course of the turbine rotor 33 of the other division C, and the streams will emerge from these two turbine courses by their discharge outlets 37. In passing through the turbine courses of turbine rotors 33 the air fans 35 of the two divisions B and C are driven at a high speed and a large volume of air is inducted by the air intakes of the divisions B and C, and the work of this air intake and populsion thereof through the discharges 36 of the fan air passes 35a cause large propulsive thrust upon the divisions B and C and thus upon the beams 43 by the bearing means 42–42a of each division B and C and thus cause a large equalized thrust at both sides of the propulsion device and upon the aircraft structure of the associated aircraft. With combustion provided by the combustion chamber 7 and fuel from fuel pump 27 there is a normal power of propulsion, but this propulsive power may be further increased by causing fuel pump 30 to deliver fuel to the fuel nozzles 28 which deliver fuel into intake chambers 22 for supplemental combustion with supplemental air passing therethrough. Thus a large additional power may be provided for unusual demands of speeds or acceleration of the aircraft, such as at take-off from the landing field or aircraft carrier, or for desired extraordinary speed when that is necessary or desirable.

As above described the propulsion means, with the propulsion units B and C stationed as shown in the FIGURES 1 and 2 (frontal view as in FIG. 2) will provide the propulsion in the forward direction of travel for translational cruising or ultra-high speed use. The positions of the divisions B and C, the air fan propulsion divisions, may be altered, as for instance to slow speed and provide additional or even complete sustentation ability for the associated aircraft, by turning the structures of the divisions B and C upon their individual pivot means, that is turning of the casings for the air fans 35 by turning of the structures thereof by the pivots 39 in the pivot bearings 42–42a of the beams, there being then turning of the pivot means 39 on the pivotal conduits 38 also. Thereby the discharges 36 of the two divisions B and C may be directed fully downwardly at right angles to their positions as shown, so discharges point and are directed vertically downwardly so that the discharging air and gases provide upward reaction thrust and thereby sustentation thrust for the associated aircraft, and this provides necessary sustentation thrust, such as may be in addition to lessened thrust of the aircrafts fixed wings (such as may be provided) or other sustentation power, which may be effective by the structure of the aircraft. This sustentation ability may be such as to be effective for complete sustentation as in hovering or slow descent of the aircraft. In such use, the control for the electric motors 51 of the control means 47–48, may be such as to turn only one of the divisions B or C to the downwardly directing sustentation position, while the other divisions B or C may be used to continue some translational propulsion thrust. The sustentation positions and thrust may if desired, especially where there is a short aircraft field or carrier use, be used on take-off of the associated aircraft, the divisions B and C being used similarly as in slow descent or landing of the aircraft.

Referring now to the form which is shown in FIGURE 4, this form is in general similar to the form illustrated in FIGURE 1 in that it has the gas pressure forming division, and the two supplementary turbines driving air fan divisions B and C. The gas pressure forming division A has only the one turbine rotor unit 6 and only the one compressor rotor unit 5 and these rotor units are secured to the one shaft 11b, so that the compressor rotor, the turbine rotor and the fuel pumping means operate as one integral unit for rotation or driving of the means. In this form the compressed air is supplied by only one compressing means compressing one stream of air and using that stream in the combustion chamber means and the turbine unit driving the compressing means, as ordinarily in gas turbine means. The gases with surplus air is delivered to the intermediate chamber 21 as in the first form and is passed through the two pivotal conduits to the two turbine units of the air fan means, as in the first form, and in the divisions B and C the air fans are rotated, as in the first form, to induct air to the air passes and discharge therefrom, independently of the gas pressurizing division A, so that there are in this form three induction intakes for air, the one to the gas pressurizing unit, and one to each of the divisions B and C. Supplemental fuel may be delivered to the gases and air entering the intake chambers 22, as in the first form.

It should be noted that the manner of air intake and compression of air as in the form FIGURE 1 there are two individual compressing units, each separately inducting and compressing air for two independent air streams and each delivering gases and air in one stream and pressurized air only by the other stream to an intermediate chamber which conducts the combined and intermingled gaseous fluids to a work or load turbine which rotates independently of the gas pressurizing unit, is a system which is contemplated to be useful, especially for the propulsion of aircraft, but is useful also as a means driving any other type of work load, as for instance for automobile or truck propulsion or locomotive propulsion or locomotive propulsion or other work performance. I especially contemplate also that the division of air compression and use of one compressed air stream for passing as cooling air through a turbine rotor unit and thereafter union of the two streams, one air and gases, the other compressed air, into one stream of common pressure is useful for driving any work load turbine and associated driven apparatus. The one stream at high pressure, the other stream at substantial pressure but somewhat lower, forming a united stream at the pressure of the lower powers a work load supplementary turbine and thereby there may be the pressure forming turbine at a very high and efficient temperature for economy and the work turbine at the pressure of the lower pressure air stream, whereby the net result is greater efficiency and economy. It may be noted also that the method of use of the supplementary air fan and its turbine powered driving provides three functions, forward propulsion, sustentation propulsion (lift) and means for braking effect, especially in use on high speed aircraft..

In the use for braking effect, the divisions B and C would be rotated on their pivot means 39 so that the discharges 36 and 37 direct discharge in the opposite direction of the thrust for forward propulsion, that is for this braking effect the divisions B and C would be rotated approximately a one-half rotation, one hundred and eighty degrees of rotation. This ability would greatly increase the deceleration of the aircraft (or other vehicle) and thus would very much shorten the distance necessary for stoppage of the aircraft.

FIGURE 3, a diagrammatic illustration of electric control means, shows that the electric motor 51 which enables rotation of the air fan ducts so that they may have change of direction of the air ejection therefrom, has the electric motor 51 which is reversible by the reversing switch R, which switch may include current flow control.

Any type of such reversing control and any type of motor means, other than electric, may be used instead, as may be determined for any particular construction.

What I claim is:

1. In propulsion means for aircraft and other means: a primary structure including, compressor combustor, turbine casings, formed to provide for gaseous fluid flow serially therethrough, the primary structure mounting rotatably therein, compressor rotor means, turbine rotor means and connective shaft means therefor; air intake means to the compressor casing; a gaseous fluid discharge from the turbine casing; means for delivery of fuel to the combustor casing for combustion with air therein; an air duct structure formed to have a frontal air intake and a rearward air jet discharge, an auxiliary turbine casing mounted in the air duct structure with jet discharge therefrom into the air flow in the air jet discharge; an auxiliary bladed turbine rotor mounted in the air duct structure to be rotatable within the auxiliary turbine casing; an air propulsion fan mounted in the air duct structure to be rotatable on an axis substantially coincident with that of the auxiliary bladed turbine rotor and drivingly connected therewith to impel air flow from the frontal air intake and about the turbine casing and through the rearward jet discharge; a mounting bearing formed in the primary structure and a mounting pivot member fixed with the air duct structure and extended laterally therefrom through the mounting bearing whereby the air duct structure is rotatable on axis substantially perpendicular to the longitudinal axis of the primary structure to enable change of direction of the fluid flow into said frontal air intake and through the rearward jet discharge and means for impelling such pivoting movement for change of flow impulsion direction; a connective duct from the first named gaseous fluid discharge and through said mounting pivot member and into an intake end of said auxiliary turbine casing; there being serial flow of induced air from the first named air intake means and fluid flow through said connective duct and said auxiliary turbine casing to its discharge and there being inducted air flow into said frontal air intake of said air duct structure and therethrough and from said rearward air jet discharge.

2. The apparatus as defined in claim 1 and; the said auxiliary air duct structure and the auxiliary turbine rotor means and auxiliary air propulsion means and associated means being in duplicate and mounted in substantially parallel formation so that normally each auxiliary air intake is directed for intake from forwardly of the direction of propulsion of the associated aircraft or vehicle and so each air discharge from auxiliary air duct structures is normally directed for thrust discharge rearwardly to provide forward impulsion of the aircraft or other means.

3. In propulsion means for aircraft and other means: a unifying structure comprised of a pair of longitudinal frame members spaced apart and supporting between them a primary structure which includes compressor, combustor, turbine casings, formed to provide for gaseous fluid flow serially therethrough, the primary structure mounting rotatably therein, compressor rotor means, turbine rotor means and connective shaft means therefor; air intake means to the compressor casing; a gaseous fluid discharge from the turbine casing; means for delivery of fuel to the combustor casing for combustion with air therein; a pair of air duct structures arranged to be laterally exteriorly of said frame members, one on one side, the other on the other side, each said air duct structure including duct with frontal air intake and rearward air jet discharge, and having an auxiliary turbine casing mounted in the air duct structure with jet discharge therefrom into the air flow in the air jet discharge, each air duct structure including an auxiliary bladed turbine rotor mounted in the air duct structure to be rotatable within the auxiliary turbine casing and including also an air propulsion fan mounted in the air duct structure to be rotatable on an axis substantially coincident with that of the auxiliary bladed turbine rotor and drivingly connected therewith to impel air flow from the frontal air intake and about the turbine casing and through the rearward jet discharge; a pair of mounting bearings formed in the unifying structure one in each frame member; each air duct structure having fixed thereon a mounting pivot member extending laterally therefrom and through the associated mounting bearing whereby the air duct structures are rotatable individually on axes substantially perpendicular to the longitudinal axis of the primary structure to enable change of direction of the fluid flow into said frontal air intakes and through the rearward jet discharges; means for impelling the pivoting movement of the air duct structures for change of flow impulsion direction; connective ducts from the first named gaseous discharge, one connective duct through each pivot member and into an intake end of the associated auxiliary turbine casing; there being serial flow from the first named air intake means and fluid flow through said connective ducts and said auxiliary turbine casings to the discharge and there being inducted air flow in each air duct structure from its frontal air intake and therethrough and from the rearward air jet discharges.

4. In propulsion means for aircraft and other means; a primary structure including, compressor, combustor, turbine casings formed to provide for gaseous fluid flow serially therethrough, and including a compressor rotor means in the compressor casing, and a primary turbine rotor means in the turbine casing and shaft connecting means providing rotation impulsion of the compressor rotor means by the primary turbine rotor means; the primary structure including a primary air intake, fuel supply to the combustor casing and turbine discharge, the fluid flow being serially into the primary air intake, through the compressor casing and combustor chamber and primary turbine casing; a secondary structure including a pair of air duct structures, one at each side of the primary structure, each air duct structure having a pivot member by which it is mounted with the primary structure to be rotational on an axis substantially perpendicular to the longitudinal axis of the primary structure; each air duct structure including axially in its structure a secondary turbine casing fixed therein, a secondary turbine rotor and an air propulsion unit mounted connectively to be rotatable respectively in the secondary turbine casing and the air duct structure for air impulsion, each air duct structure having air intake, air passage annularly of the secondary turbine casing and jet discharge to atmosphere; each secondary turbine casing having jet discharge to atmosphere; connective duct means from the primary turbine casing and through branches thereof one in each said pivot member and therethrough to the secondary turbine casing for impulsion driving of the associated turbine rotor; control means for the pair of air duct structures to provide control rotation of the air duct structures and their integrated means for change of direction of jet thrust from said air duct structures.

5. Propulsion means for aircraft and other means embodying: a primary structure having primary air intake, a compressor means, a combustor means, and a primary turbine means driving the air compressor means, such means forming pressurized gas generation means: a pair of frame members at laterally placed locations one at each side of the primary structure and firmly secured thereto, each frame member having a mounting bearing with axis perpendicular to the longitudinal axis of the primary structure; a pair of air duct structures each having a frontal air intake and rearward jet discharge and air propulsion means mounted rotationally on a shaft having an axis longitudinally therein; each air duct structure having a mounting pivot member fixed therewith to extend laterally from the air duct structure and through one of said mounting bearings and by which the air duct structure is rotational in the mounting bearing; a turbine duct means having a secondary turbine rotor means mounted rotationally therein, the turbine duct means including passage from said pressurized gas generation means to said gas jet discharge means to permit flow of generated pressurized gas therethrough; a control shaft mounted transversely of the primary structure at the rearward end thereof and actuatable rotationally by control motor means to transmit rotational impulse similarly to each said air duct structure.

References Cited

UNITED STATES PATENTS

| | | | |
|---|---|---|---|
| 3,048,376 | 8/1962 | Howald et al. | 60—262 XR |
| 3,368,352 | 2/1968 | Hewson | 60—262 XR |
| 1,881,792 | 10/1932 | Mariani | 244—56 |
| 2,501,078 | 3/1950 | Newcomb | 60—224 |
| 2,933,886 | 4/1960 | Sharma | 60—270 XR |
| 3,016,698 | 1/1962 | Sobey | 60—39.17 XR |
| 3,054,577 | 9/1962 | Wolf et al. | 60—226 |
| 3,146,590 | 9/1964 | Erwin | 60—39.17 |
| 3,212,733 | 10/1965 | Kutney | 244—54 |
| 3,279,192 | 10/1966 | Hull et al. | 60—264 |
| 3,318,095 | 5/1967 | Snell | 60—226 |
| 3,348,379 | 10/1967 | Wilde et al. | 60—226 |
| 3,363,419 | 1/1968 | Wilde | 60—226 |

FOREIGN PATENTS

| | | |
|---|---|---|
| 503,738 | 12/1954 | Italy. |
| 526,904 | 9/1940 | Great Britain. |

CARLTON R. CROYLE, *Primary Examiner.*

U.S. Cl. X.R.

60—39.17, 228, 261, 262, 264